United States Patent
Chen et al.

(10) Patent No.: US 11,469,807 B2
(45) Date of Patent: Oct. 11, 2022

(54) METHOD AND DEVICE FOR TRIGGERING MEASUREMENT AND REPORTING, AND STORAGE MEDIUM THEREOF

(71) Applicant: ZTE CORPORATION, Guangdong (CN)

(72) Inventors: Yijian Chen, Shenzhen (CN); Yu Ngok Li, Shenzhen (CN); Hao Wu, Shenzhen (CN); Zhaohua Lu, Shenzhen (CN); Huahua Xiao, Shenzhen (CN); Jianxing Cai, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/768,562

(22) PCT Filed: Nov. 29, 2018

(86) PCT No.: PCT/CN2018/118075
§ 371 (c)(1),
(2) Date: May 29, 2020

(87) PCT Pub. No.: WO2019/105400
PCT Pub. Date: Jun. 6, 2019

(65) Prior Publication Data
US 2021/0175948 A1 Jun. 10, 2021

(30) Foreign Application Priority Data
Nov. 29, 2017 (CN) .......................... 201711230970.0

(51) Int. Cl.
*H04B 7/06* (2006.01)
*H04B 17/336* (2015.01)
(Continued)

(52) U.S. Cl.
CPC .......... *H04B 7/0626* (2013.01); *H04B 17/336* (2015.01); *H04L 1/0068* (2013.01); *H04L 1/1614* (2013.01); *H04W 24/10* (2013.01)

(58) Field of Classification Search
CPC ... H04B 7/0626; H04B 17/336; H04L 1/0068; H04W 24/10
See application file for complete search history.

(56) References Cited

U.S. PATENT DOCUMENTS

| | | | |
|---|---|---|---|
| 11,108,515 B2 * | 8/2021 | Kwak | .................. H04W 72/02 |
| 2013/0301448 A1 | 11/2013 | Sayana et al. | |

(Continued)

FOREIGN PATENT DOCUMENTS

| | | |
|---|---|---|
| CN | 102377469 A | 3/2012 |
| CN | 103166734 A | 6/2013 |

(Continued)

OTHER PUBLICATIONS

International Search Report of PCT Application No. PCT/CN2018/118075—4 pages (dated Feb. 27, 2019).

(Continued)

*Primary Examiner* — Deepa Belur
(74) *Attorney, Agent, or Firm* — Knobbe, Martens, Olson & Bear, LLP

(57) ABSTRACT

Provided are a method and device for triggering measurement and reporting. The method includes: configuring K1 channel state information (CSI) measurement and reporting parameter sets for a receiving end, where the CSI measurement and reporting parameter sets comprise at least one set of aperiodic measurement reference resources; configuring spatial characteristic parameters for the aperiodic measurement reference resources in the K1 CSI measurement and reporting parameter sets, where K1 is greater than or equal to 1; and indicating the K1 CSI measurement and reporting (Continued)

parameter sets to the receiving end; where the CSI measurement and reporting parameter sets include a measurement reference resource set, the measurement reference resource set includes at least one aperiodic measurement reference resource set; and the aperiodic measurement reference resource set includes at least one set of the aperiodic measurement reference resources.

20 Claims, 2 Drawing Sheets

(51) Int. Cl.
*H04L 1/00* (2006.01)
*H04L 1/16* (2006.01)
*H04W 24/10* (2009.01)

(56) References Cited

U.S. PATENT DOCUMENTS

| | | |
|---|---|---|
| 2013/0301589 A1 | 11/2013 | Li et al. |
| 2014/0293815 A1 | 10/2014 | Xia et al. |
| 2017/0126299 A1 | 5/2017 | Wei et al. |
| 2017/0290053 A1 | 10/2017 | Hwang et al. |
| 2017/0332268 A1 | 11/2017 | Yang et al. |
| 2019/0069285 A1* | 2/2019 | Chandrasekhar ...... H04B 7/088 |
| 2019/0190673 A1* | 6/2019 | Kwak .................. H04B 7/0632 |
| 2019/0379503 A1* | 12/2019 | Kang .................... H04B 7/088 |
| 2020/0304192 A1* | 9/2020 | Yum .................... H04B 7/0626 |
| 2021/0337406 A1* | 10/2021 | Zhang .................... H04L 5/001 |
| 2021/0344397 A1* | 11/2021 | Lee ...................... H04L 5/0048 |
| 2022/0132549 A1* | 4/2022 | Yu ........................ H04L 1/1812 |

FOREIGN PATENT DOCUMENTS

| | | | |
|---|---|---|---|
| CN | 104052532 A | 9/2014 | |
| CN | 107135025 A | 9/2017 | |
| CN | 108112034 A | 6/2018 | |
| EP | 2662987 A2 | 11/2013 | |
| EP | 2667681 A1 | 11/2013 | |
| RU | 2713407 C1 * | 2/2020 | .............. H04B 7/08 |
| WO | WO 2015/168925 A1 | 11/2015 | |
| WO | WO-2021064641 A1 * | 4/2021 | ........... H04L 1/0026 |

OTHER PUBLICATIONS

ZTE et al, "Remaining Details for Aperiodic CSI-RS", 3GPP TSG RAN WG1 Meeting #87, R1-1611432—5 pages (Nov. 18, 2016).
Samsung: "Discussions on remaining details of rate matching and QCL for aperiodic and multi-shot CSI-RS", Oct. 10-14, 2016, 3GPP TSG RAN WG1 #86bis, R1-1609025.
Qualcomm Incorporated: "Remaining details on aperiodic CSI-RS", Oct. 10-14, 2016, 3GPP TSG RAN WG1 #86bis, R1-1609972.
Samsung: "Support of QCL indication for aperiodic and multi-shot CSI-RS", Nov. 14-18, 2016, 3GPP TSG RAN WG1 #87, Rt-1612427.
Supplemental Partial European Search Report for EP 18883353 dated Jul. 16, 2021.

* cited by examiner

METHOD AND DEVICE FOR TRIGGERING MEASUREMENT AND REPORTING, AND STORAGE MEDIUM THEREOF

CROSS-REFERENCE TO RELATED APPLICATIONS

This is a National Stage Application, filed under 35 U.S.C. 371, of International Patent Application No. PCT/CN2018/118075, filed on Nov. 29, 2018, which claims the priority of Chinese patent application No. 201711230970.0 filed on Nov. 29, 2017, contents of both of which are incorporated herein by reference in their entireties.

TECHNICAL FIELD

The present disclosure relates to communications and, in particular, to a method and device for triggering measurement and reporting, and a storage medium thereof.

BACKGROUND

An important research direction in the multi-antenna technology is how to achieve flexible and accurate measurement and reporting of channel state information (CSI). In a 5th generation wireless system (5G), a measurement reference resource (a reference resource includes a channel measurement reference resource and an interference measurement reference resource) may be divided into multiple types.

In the related art, a periodic reference resource includes such as a periodic CSI measurement reference resource (periodic CSI-RS, P-CSI-RS for short), a periodic interference measurement reference resource (periodic CSI-IM, P-CSI-IM for short); a semi-persistent periodic reference resource includes such as a semi-persistent CSI measurement reference resource (semi-persistent CSI-RS, SP CSI-RS for short), a semi-persistent periodic interference measurement reference resource (semi-persistent CSI-IM, SAP-CSI-IM for short); an aperiodic reference resource includes such as an aperiodic CSI measurement reference resource (aperiodic CSI-RS, AP-CSI-RS for short), an aperiodic interference measurement reference resource (aperiodic CSI-IM, AP-CSI-IM for short).

The triggering mechanism in the related art is that physical layer signaling triggers an access point (AP) reference resource (which may be used for channel and/or interference measurement), and feedback corresponding to the AP reference resource is triggered through the physical layer signaling. If there are a large number of AP reference resources, it is difficult to have enough physical layer bits for performing triggering.

Since an access point (AP) reference resource dynamical triggering is only supported with a relatively limited number of AP reference resources, flexibility of the AP reference resource triggering is limited. When there are measurement requirements on multiple cells, on multiple carriers, on multiple beams, and on multiple group antennas, the transmission performance will be affected, because measurement information cannot be accurately required in time.

SUMMARY

The present disclosure provides a method and device for triggering measurement and reporting.

The present disclosure provides a method for triggering measurement and reporting, and the method includes steps described below. K1 channel state information (CSI) measurement and reporting parameter sets are configured for a receiving end, where the CSI measurement and reporting parameter sets include one or more sets of aperiodic measurement reference resources. Spatial characteristic parameters are configured for the aperiodic measurement reference resources in the K1 CSI measurement and reporting parameter sets, where K1 is greater than or equal to 1. The K1 CSI measurement and reporting parameter sets are indicated to the receiving end, where the CSI measurement and reporting parameter sets include a measurement reference resource set, the measurement reference resource set includes one or more aperiodic measurement reference resource sets; and the aperiodic measurement reference resource sets include one or more sets of the aperiodic measurement reference resources.

The present disclosure provides another method for triggering measurement and reporting, and the method includes steps described below. An aperiodic measurement reference resource set is configured for a receiving end. When the aperiodic measurement reference resource set includes multiple sets of aperiodic measurement reference resources, the aperiodic measurement reference resources are indicated to the receiving end by bitmap signaling; where the aperiodic measurement reference resources are used for performing rate matching and/or measurement and reporting by the receiving end.

The present disclosure provides another method for triggering measurement and reporting, and the method includes a step described below. Reporting content indication information is configured for a channel state information (CSI) measurement and reporting parameter set, where the CSI measurement and reporting parameter set includes a measurement reference resource set, the measurement reference resource set includes one or more aperiodic measurement reference resource sets, the aperiodic measurement reference resource sets include one or more sets of aperiodic measurement reference resources, and the reporting content indication information is used for indicating whether the receiving end needs to report and/or a reporting information type.

The present disclosure provides another method for triggering measurement and reporting, and the method includes steps described below. K1 channel state information (CSI) measurement and reporting parameter sets indicated by a sending end are received, where the K1 CSI measurement and reporting parameter sets include one or more sets of aperiodic measurement reference resources, and K1 is greater than or equal to 1. At least one of rate matching or CSI measurement and reporting is performed according to the aperiodic measurement reference resources.

The present disclosure provides a device for triggering measurement and reporting. The device includes a first configuration module, a second configuration module and an indication module. The first configuration module is configured to configure K1 channel state information (CSI) measurement and reporting parameter sets for a receiving end, where the CSI measurement and reporting parameter sets include one or more sets of aperiodic measurement reference resources. The second configuration module is configured to configure spatial characteristic parameters for the aperiodic measurement reference resources in the K1 CSI measurement and reporting parameter sets, where K1 is greater than or equal to 1. The indication module is configured to indicate the K1 CSI measurement and reporting parameter sets to the receiving end. The CSI measurement and reporting parameter sets include a measurement reference resource set, the measurement reference resource set includes one or more aperiodic measurement reference resource sets; and the aperiodic measurement reference resource sets include one or more sets of the aperiodic measurement reference resources.

The present disclosure provides another device for triggering measurement and reporting, and the device includes a configuration module and an indication module. The configuration module is configured to configure an aperiodic measurement reference resource set to for a receiving end. The indication module is configured to indicate aperiodic measurement reference resources to the receiving end by bitmap signaling, when the aperiodic measurement reference resource set includes multiple sets of the aperiodic measurement reference resources; where the aperiodic measurement reference resources are used for performing rate matching and/or measurement and reporting by the receiving end.

The present disclosure provides another device for triggering measurement and reporting, and the device includes a configuration module, which is configured to configure reporting content indication information for a channel state information (CSI) measurement and reporting parameter set; where the CSI measurement and reporting parameter set includes a measurement reference resource set, the measurement reference resource set includes one or more aperiodic measurement reference resource sets, the aperiodic measurement reference resource sets include one or more sets of aperiodic measurement reference resources, and the reporting content indication information is used for indicating whether the receiving end needs to report and/or a reporting information type.

The present disclosure provides another device for triggering measurement and reporting, and the device includes a receiving module and a performing module. The receiving module is configured to receive K1 channel state information (CSI) measurement and reporting parameter sets indicated by a sending end, where the K1 CSI measurement and reporting parameter sets include one or more one or more aperiodic measurement reference resource sets, where K1 is greater than or equal to 1. The performing module is configured to perform rate matching and/or CSI measurement and reporting according to the aperiodic measurement reference resources.

The present disclosure provides a storage medium including a stored program. When the program is executed, the method of any one of the embodiments described above is performed.

The present disclosure provides a processor, which is used for executing a program. When run, the program executes the method of any one of the embodiments described above.

Through the present disclosure, by configuring the spatial characteristic parameters of the aperiodic measurement reference resources in the CSI measurement and reporting parameter set, the configured number of sets of aperiodic measurement reference resources is reduced thereby simplifying signaling design and increasing flexibility.

BRIEF DESCRIPTION OF DRAWINGS

The drawings described herein are used to provide a further understanding of the present disclosure, and form a part of the present application. The exemplary embodiments and descriptions thereof in the present disclosure are used to explain the present disclosure and do not limit the present disclosure in any improper way. In the drawings.

DETAILED DESCRIPTION

The present disclosure will be described hereinafter in detail with reference to the drawings and in conjunction with embodiments. It is to be noted that if not in collision, the embodiments and features therein in the present application can be combined with each other.

It should be noted that the terms of "first", "second" and the like in the description, claims and above drawings of the present disclosure are used to distinguish between similar objects and are not necessarily used to describe a particular order or sequence.

Embodiment One

Network architecture of the embodiments of the present disclosure includes a sending end and a receiving end, where the sending end may be a base station, the receiving end may be a terminal, and the sending end interacts with the receiving end.

Figure 1:
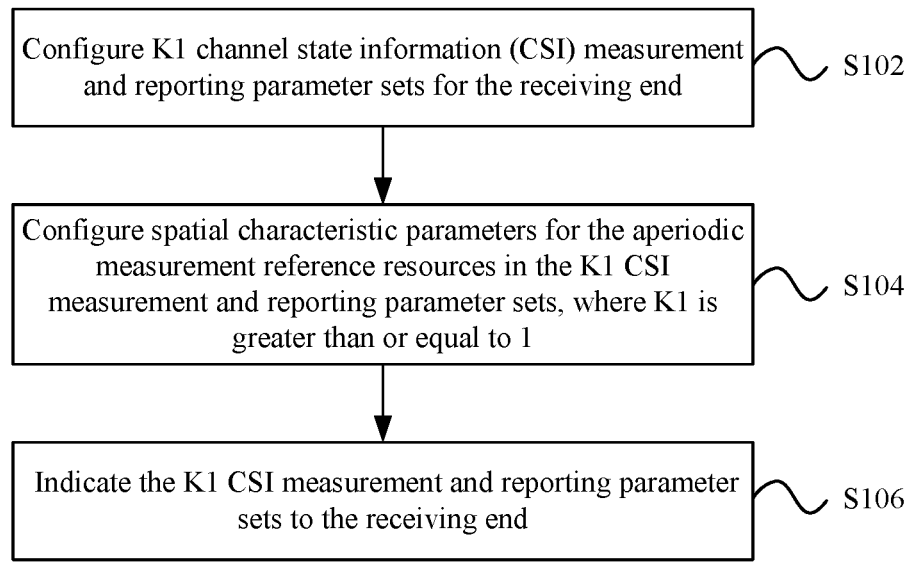
FIG. 1 is a flowchart of a method for triggering measurement and reporting according to an embodiment of the present disclosure.

A method for triggering measurement and reporting is provided in this embodiment. FIG. 1 is a flowchart of a method for triggering measurement and reporting according to an embodiment of the present disclosure. As shown in FIG. 1, the method includes steps described below.

In step S102, K1 channel state information (CSI) measurement and reporting parameter sets are configured for the receiving end, where the CSI measurement and reporting parameter sets includes one or more sets of aperiodic measurement reference resources.

In step S104, spatial characteristic parameters are configured for the aperiodic measurement reference resources in the K1 CSI measurement and reporting parameter sets, where K1 is greater than or equal to 1.

In step S106, the K1 CSI measurement and reporting parameter sets are indicated to the receiving end.

Through the above steps, by configuring the spatial characteristic parameters of the aperiodic measurement reference resources in the CSI measurement and reporting parameter set, the configured number of sets of aperiodic measurement reference resources is reduced thereby simplifying signaling design and increasing flexibility.

The above steps may be executed by the sending end, such as a base station, etc., but it is not limited thereto.

The step in which the spatial characteristic parameters are configured for the aperiodic measurement reference resources in the K1 CSI measurement and reporting parameter sets includes at least one of steps described below.

The spatial characteristic parameters are represented by a quasi-co-location (QCL) indication.

The aperiodic measurement reference resources include at least one of: aperiodic channel measurement reference resources or aperiodic interference measurement reference resources.

The step in which the spatial characteristic parameters are configured for the aperiodic measurement reference resources in the K1 CSI measurement and reporting parameter sets includes at least one of steps described below.

The step in which the aperiodic measurement reference resources are indicated to the receiving end by the bitmap signaling includes at least one of manners described below.

The content to be reported includes at least one of: channel quality information (CQI), a reference signal receiving power (RSRP), a null, or N is a positive integer greater than 0.

The step in which the reporting content indication information is configured for the CSI measurement and reporting parameter set includes one of steps described below.

The method further includes a step described below. Whether the reporting content indication information needs to be sent is implicitly determined according to a sending configuration of an aperiodic measurement reference resource.

When the K1 CSI measurement and reporting parameter sets include multiple sets of aperiodic measurement reference resources, the CSI measurement and reporting including multiple measurement types is performed according to the aperiodic measurement reference resources.

The multiple measurement types include at least a selection measurement and a joint measurement.

The method further includes a step described below. A measurement type corresponding to an aperiodic measurement reference resource is determined according to at least one of a type or a sending configuration of the aperiodic measurement reference resource.

From the description of the above-mentioned embodiments, it will be apparent to those skilled in the art that the method in the embodiments described above may be implemented by software plus a necessary general-purpose hardware platform, or may of course be implemented by hardware. However, in many cases, the former is an alternative implementation manner. Based on this understanding, the schemes provided by the present disclosure substantially, or the part contributing to the related art, may be embodied in the form of a software product. The computer software product is stored in a storage medium (such as a read only memory (ROM)/a random access memory (RAM), a magnetic disk or an optical disk) and includes several instructions for enabling terminal equipment (which may be a mobile phone, a computer, a server, network equipment or the like) to perform the methods according to each embodiment of the present disclosure.

Embodiment Two

This embodiment further provides a device for triggering measurement and reporting. The device is configured to implement the above-mentioned embodiments and alternative embodiments. What has been described will not be repeated. As used below, the term "module" may be software, hardware or a combination thereof capable of implementing predetermined functions. The device in the embodiment described below is preferably implemented by software, but implementation by hardware or by a combination of software and hardware is also possible and conceived.

Figure 2:
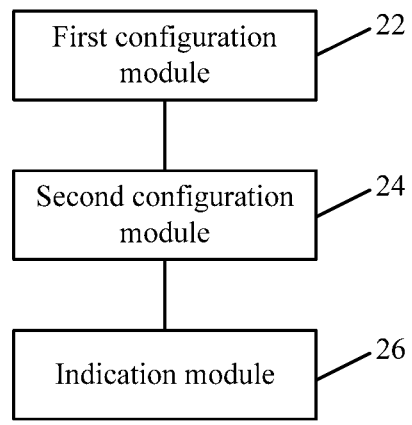
FIG. 2 is a block diagram of a device for triggering measurement and reporting according to an embodiment of the present disclosure.

FIG. 2 is a block diagram of a device for triggering measurement and reporting according to an embodiment of the present disclosure. As shown in FIG. 2, the device includes a first configuration module 22, a second configuration module 24 and an indication module 26.

The first configuration module 22 is configured to configure K1 channel state information (CSI) measurement and reporting parameter sets for a receiving end, where the CSI measurement and reporting parameter sets include one or more sets of aperiodic measurement reference resources.

The second configuration module 24 is configured to configure spatial characteristic parameters for the aperiodic measurement reference resources in the K1 CSI measurement and reporting parameter sets, where K1 is greater than or equal to 1.

The indication module 26 is configured to indicate the K1 CSI measurement and reporting parameter sets to the receiving end.

The CSI measurement and reporting parameter sets include a measurement reference resource set, the measurement reference resource set includes one or more aperiodic measurement reference resource sets; and the aperiodic measurement reference resource sets include one or more sets of the aperiodic measurement reference resources.

This embodiment further provides another device for triggering measurement and reporting. The device includes a configuration module and an indication module. The configuration module is configured to configure an aperiodic measurement reference resource set for a receiving end. The indication module is configured to indicate the aperiodic measurement reference resources to the receiving end by bitmap signaling, when the aperiodic measurement reference resource set includes multiple sets of aperiodic measurement reference resources; where the aperiodic measurement reference resources are used for performing rate matching and/or measurement and reporting by the receiving end.

This embodiment further provides another device for triggering measurement and reporting. The device includes a configuration module, which is configured to configure reporting content indication information for a channel state information (CSI) measurement and reporting parameter set; where the CSI measurement and reporting parameter set includes a measurement reference resource set, the measurement reference resource set includes one or more aperiodic measurement reference resource sets, the aperiodic measurement reference resource sets include one or more sets of aperiodic measurement reference resources, and the reporting content indication information is used for indicating whether the receiving end needs to report and/or a reporting information type.

This embodiment further provides another device for triggering measurement and reporting. The device includes a receiving module and a performing module. The receiving module is configured to receive K1 channel state information (CSI) measurement and reporting parameter sets indicated by a sending end, where the K1 CSI measurement and reporting parameter sets include one or more sets of aperiodic measurement reference resources, where K1 is greater than or equal to 1. The performing module is configured to perform rate matching and/or CSI measurement and reporting according to the aperiodic measurement reference resources.

It should be noted that the various modules described above may be implemented by software or hardware. An implementation by hardware may, but not necessarily, be performed in following manners: the various modules described above are located in a same processor, or the various modules described above are located in their respective processors in any combination form.

Embodiment Three

This embodiment is an alternative embodiment of the present disclosure and used for describing the present application in detail in conjunction with examples.

It is considered that a CSI measurement and reporting mechanism needs to be flexible enough to support multiple application scenarios, which poses a great challenge to its flexibility. The flexibility is mainly reflected in measurement and reporting related to aperiodic CSI-RSs and aperiodic CSI-IMs. There are many types of such reference resource configurations, which are widely used for different purposes, different terminals, different moments and different scenarios. Therefore, there are high requirements on flexibility of triggering. The above-mentioned issues may be solved and improved through following examples.

Example 1

An AP reference resource generally needs to indicate its spatial characteristic parameter to determine how to perform a reception. Generally, the spatial characteristic parameter varies with a sending beam, and the spatial characteristic parameter is used as a sending parameter to indicate jointly with its resource position in a sending configuration of the AP reference resource. A conventional means includes, in step 1, a resource position parameter and other necessary parameters of the AP reference resource are configured, in step 2, a spatial characteristic parameter is configured for the AP reference resource, in step 3, the AP reference resource is configured for the CSI measurement and reporting.

A disadvantage of this manner is that when a sending end uses a same time-frequency resource and X different sending beams for a transmission, it is necessary to configure X sets of time-frequency resources AP reference resources, which respectively correspond to X kinds of spatial characteristic parameters, which is equivalent to generate X sets of AP reference resources. This manner makes configuration signaling complicated due to a significantly increased number of AP reference resources.

A new scheme proposed by the present disclosure is to indicate spatial characteristic parameter information in a CSI reporting trigger configuration. Compared with configuring a spatial characteristic parameter in an AP reference resource transmission parameter, this scheme proposed by the present disclosure has higher flexibility and lower complexity. Steps of this scheme may be described as below.

In step 101, a base station configures K1 CSI measurement and reporting parameter sets for a terminal; where K1 is greater than or equal to 1, and K is an integer.

Figure 3:
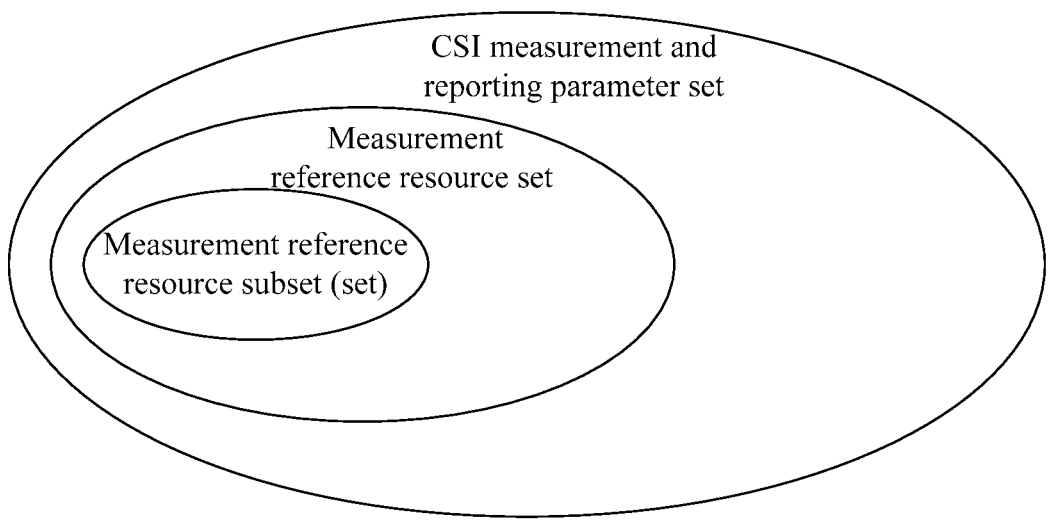
FIG. 3 is a schematic diagram of a CSI measurement and reporting parameter set of the present embodiment.

The CSI measurement and reporting parameter sets include one or more measurement reference resource sets; a type of a measurement reference resource may be an interference/channel measurement reference resource; the measurement reference resource sets include one or more aperiodic measurement reference resource sets; the aperiodic measurement reference resource sets include one or more sets of aperiodic measurement reference resources. As shown in FIG. 3, FIG. 3 is a schematic diagram of a CSI measurement report parameter set of this embodiment.

In step 102, the base station configures corresponding spatial characteristic parameters for the aperiodic measurement reference resources included in the K1 CSI measurement and reporting parameter sets.

Sub-manner 0: public spatial characteristic parameters are configured for the aperiodic measurement reference resources included in all CSI measurement and reporting parameter sets.

Sub-manner 1: public spatial characteristic parameters are configured for aperiodic measurement reference resources included in a same CSI measurement and reporting parameter set. Different CSI measurement and reporting parameter sets are configured separately.

Manner 2: one piece of public indication information is configured for aperiodic measurement reference resources included in a same measurement reference resource set to indicate whether reporting is needed or the reporting type. Different measurement reference resource sets are configured separately.

Manner 3: indication information is respectively configured for different aperiodic measurement reference resource subsets to indicate whether reporting is needed or the reporting type.

Manner 4: whether reporting is needed or the reporting type is implicitly determined according to a sending configuration of an aperiodic measurement reference resource.

Manner 5: it is implicitly determined whether additional bits are needed to indicate "whether the reporting is needed" according to a sending configuration of an aperiodic measurement reference resource.

The aperiodic measurement reference resource set includes one or more sets of aperiodic measurement reference resources, if multiple sets of aperiodic measurement reference resources are included, it is necessary to determine a processing manner for the measurement and reporting of the aperiodic measurement reference resources according to a use of the aperiodic measurement reference resources; the processing manner includes: a selection measurement and a joint measurement.

The selection measurement includes: the receiving end selects from among multiple sets of aperiodic measurement reference resources, one or more sets are selected, and the measurement and reporting is performed, selection result indication information may also be fed back.

In this embodiment, the storage medium may be configured to store program codes for executing steps described below.

In the present embodiment, the storage medium in this embodiment may include, but not limited to, a USB flash disk, a read only memory (ROM for short), a random access memory (RAM for short), a mobile hard disk, a magnetic disk, an optical disk or another medium capable of storing program codes.

In the embodiment, the programs described above are used for performing steps described below.

In an embodiment, for some examples in this embodiment, reference may be made to the examples described in the above-mentioned embodiments and alternative embodiments, and repetition will not be made in the present embodiment.

Apparently, it should be understood by those skilled in the art that each of the modules or steps of the present disclosure described above may be implemented by a general-purpose computing apparatus, the modules or steps may be concentrated on a single computing apparatus or distributed on a network composed of multiple computing apparatuses, or, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any combination of hardware and software.

What is claimed is:

1. A method for triggering measurement and reporting, comprising:
  configuring K1 channel state information (CSI) measurement and reporting parameter sets for a receiving end, wherein the CSI measurement and reporting parameter sets comprise at least one set of aperiodic measurement reference resources;
  in response to the aperiodic measurement reference resources being triggered for measurement and reporting, configuring spatial characteristic parameters for the aperiodic measurement reference resources in the K1 CSI measurement and reporting parameter sets, wherein K1 is greater than or equal to 1; and
  indicating the K1 CSI measurement and reporting parameter sets to the receiving end;
  wherein one CSI measurement and reporting parameter set comprises at least one measurement reference resource set, one measurement reference resource set comprises at least one aperiodic measurement reference resource set; and one aperiodic measurement reference resource set comprises at least one aperiodic measurement reference resource subset;
  wherein configuring the spatial characteristic parameters for the aperiodic measurement reference resources in the K1 CSI measurement and reporting parameter sets comprises at least one of:
  configuring values of spatial characteristic parameters for the aperiodic measurement reference resources in the K1 CSI measurement and reporting parameter sets;
  configuring different values of spatial characteristic parameters for different CSI measurement and reporting parameter sets in the K1 CSI measurement and reporting parameter sets, wherein values of the spatial characteristic parameters configured for aperiodic measurement reference resources in a same CSI measurement and reporting parameter set are same;
  configuring different values of spatial characteristic parameters for different measurement reference resource sets in the K1 CSI measurement and reporting parameter sets, wherein values of the spatial characteristic parameters configured for aperiodic measurement reference resources in a same measurement reference resource set are same; or
  configuring values of spatial characteristic parameters respectively for different aperiodic measurement reference resources in the K1 CSI measurement and reporting parameter sets.

2. The method of claim 1, wherein the spatial characteristic parameters are represented by a quasi-co-location (QCL) indication.

3. The method of claim 1, wherein the aperiodic measurement reference resources comprise at least one of: aperiodic channel measurement reference resources or aperiodic interference measurement reference resources.

4. The method of claim 3, wherein configuring the spatial characteristic parameters for the aperiodic measurement reference resources in the K1 CSI measurement and reporting parameter sets comprises at least one of:
  configuring spatial characteristic parameters respectively for aperiodic channel measurement reference resources and aperiodic interference measurement reference resources in the K1 CSI measurement and reporting parameter sets; or
  configuring same spatial characteristic parameters for the aperiodic channel measurement reference resources and the aperiodic interference measurement reference resources in the K1 CSI measurement and reporting parameter sets.

5. A method for triggering measurement and reporting, comprising:
  receiving K1 channel state information (CSI) measurement and reporting parameter sets indicated by a sending end, wherein spatial characteristic parameters are configured for aperiodic measurement reference resources in the K1 CSI measurement and reporting parameter sets in response to the aperiodic measurement reference resources being triggered for measurement and reporting; one of the K1 CSI measurement and reporting parameter sets comprises at least one measurement reference resource set, one measurement reference resource set comprises at least one aperiodic measurement reference resource set; one aperiodic measurement reference resource set comprises at least one aperiodic measurement reference resource subset, and K1 is greater than or equal to 1; and
  performing at least one of rate matching or CSI measurement and reporting according to the aperiodic measurement reference resources;
  wherein the spatial characteristic parameters are configured for the aperiodic measurement reference resources in the K1 CSI measurement and reporting parameter sets in at least one of the following manners;
  configuring values of spatial characteristic parameters for the aperiodic measurement reference resources in the K1 CSI measurement and reporting parameter sets;
  configuring different values of spatial characteristic parameters for different CSI measurement and reporting parameter sets in the K1 CSI measurement and reporting parameter sets, wherein values of the spatial characteristic parameters configured for aperiodic measurement reference resources in a same CSI measurement and reporting parameter set are same;
  configuring different values of spatial characteristic parameters for different measurement reference resource sets in the K1 CSI measurement and reporting parameter sets, wherein values of the spatial characteristic parameters configured for aperiodic measurement reference resources in a same measurement reference resource set are same; or
  configuring values of spatial characteristic parameters respectively for different aperiodic measurement reference resources in the K1 CSI measurement and reporting parameter sets.

6. The method of claim 5, further comprising: in a case where the K1 CSI measurement and reporting parameter sets comprise a plurality of sets of aperiodic measurement reference resources, performing the CSI measurement and reporting including at least one measurement type according to the aperiodic measurement reference resources.

7. The method of claim 6, wherein the measurement type at least comprises: a selection measurement or a joint measurement.

8. The method of claim 5, further comprising:
  determining a measurement type corresponding to an aperiodic measurement reference resource according to at least one of a type of the aperiodic measurement reference resource or a sending configuration of the aperiodic measurement reference resource.

9. A device for triggering measurement and reporting, comprising: a processor and a memory, wherein the processor is configured to execute a program for triggering measurement and reporting stored in the memory to implement the method of claim 1.

10. A device for triggering measurement and reporting, comprising: a processor and a memory, wherein the processor is configured to execute a program for triggering measurement and reporting stored in the memory to implement the method of claim 5.

11. A non-transitory storage medium, comprising a stored program, wherein the program, when run, executes the method of claim 1.

12. The device of claim 9, wherein the spatial characteristic parameters are represented by a quasi-co-location (QCL) indication.

13. The device of claim 9, wherein the aperiodic measurement reference resources comprise at least one of: aperiodic channel measurement reference resources or aperiodic interference measurement reference resources.

14. The device of claim 13, wherein the processor is configured to implement configuring the spatial characteristic parameters for the aperiodic measurement reference resources in the K1 CSI measurement and reporting parameter sets by at least one of:
configuring spatial characteristic parameters respectively for aperiodic channel measurement reference resources and aperiodic interference measurement reference resources in the K1 CSI measurement and reporting parameter sets; or
configuring same spatial characteristic parameters for the aperiodic channel measurement reference resources and the aperiodic interference measurement reference resources in the K1 CSI measurement and reporting parameter sets.

15. A non-transitory storage medium, comprising a stored program, wherein the program, when run, executes the method of claim 5.

16. A method for triggering measurement and reporting, comprising:
configuring a plurality of sets of aperiodic measurement reference resources for a receiving end; wherein spatial characteristic parameters are configured for the aperiodic measurement reference resources in K1 CSI measurement and reporting parameter sets in response to the aperiodic measurement reference resources being triggered for measurement and reporting; and
indicating, to the receiving end, the plurality of sets of aperiodic measurement reference resources by bitmap signaling; wherein the plurality of sets of aperiodic measurement reference resources are used for performing at least one of rate matching or measurement and reporting by the receiving end;
wherein the spatial characteristic parameters are configured for the aperiodic measurement reference resources in the K1 CSI measurement and reporting parameter sets in at least one of the following manners:
configuring values of spatial characteristic parameters for the aperiodic measurement reference resources in the K1 CSI measurement and reporting parameter sets;
configuring different values of spatial characteristic parameters for different CSI measurement and reporting parameter sets in the K1 CSI measurement and reporting parameter sets, wherein values of the spatial characteristic parameters configured for aperiodic measurement reference resources in a same CSI measurement and reporting parameter set are same;
configuring different values of spatial characteristic parameters for different measurement reference resource sets in the K1 CSI measurement and reporting parameter sets, wherein values of the spatial characteristic parameters configured for aperiodic measurement reference resources in a same measurement reference resource set are same; or
configuring values of spatial characteristic parameters respectively for different aperiodic measurement reference resources in the K1 CSI measurement and reporting parameter sets.

17. The method of claim 16, wherein indicating the aperiodic measurement reference resources to the receiving end by the bitmap signaling comprises one of:
determining a content to be reported corresponding to the aperiodic measurement reference resources, selecting N sets of the aperiodic measurement reference resources from the plurality of sets of aperiodic measurement reference, and indicating the N sets of the aperiodic measurement reference resources to the receiving end, wherein a value or a value range of N is determined according to the content to be reported;
in response to the aperiodic measurement reference resources being used for one of receiving beam training, time-frequency offset tracking, or uplink reciprocity calculation for uplink precoding, determining a value range of N, selecting the N sets of the aperiodic measurement reference resources, and indicating the N sets of the aperiodic measurement reference resources to the receiving end;
determining a sending parameter configuration of the aperiodic measurement reference resources, selecting the N sets of the aperiodic measurement reference resources, and indicating the N sets of the aperiodic measurement reference resources to the receiving end, wherein N is a positive integer greater than 0, and a value or a value range of N is determined according to the sending parameter configuration of the aperiodic measurement reference resources.

18. The method of claim 16, wherein the content to be reported comprises at least one of: channel quality information (CQI), a reference signal receiving power (RSRP), a null, or N is a positive integer greater than 0.

19. A device for triggering measurement and reporting, comprising: a processor and a memory, wherein the processor is configured to execute a program for triggering measurement and reporting stored in the memory to implement the method of claim 16.

20. A non-transitory storage medium, comprising a stored program, wherein the program, when run, executes the method of claim 16.

* * * * *

UNITED STATES PATENT AND TRADEMARK OFFICE
CERTIFICATE OF CORRECTION

PATENT NO. : 11,469,807 B2
APPLICATION NO. : 16/768562
DATED : October 11, 2022
INVENTOR(S) : Yijian Chen et al.

It is certified that error appears in the above-identified patent and that said Letters Patent is hereby corrected as shown below:

In the Specification

Column 1, Line 39, delete "SAP" and insert -- SP --

Column 3, Line 57, delete "reduced" and insert -- reduced, --

Column 4, Line 50, delete "reduced" and insert -- reduced, --

Column 4, Line 51, after "thereby simplifying signaling design and increasing flexibility.", insert the following paragraph -- The CSI measurement and reporting parameter sets include a measurement reference resource set, the measurement reference resource set includes one or more aperiodic measurement reference resource sets; and the aperiodic measurement reference resource sets include one or more sets of the aperiodic measurement reference resources. --

Column 4, Line 57, after "includes at least one of steps described below.", insert the following paragraphs -- Public spatial characteristic parameters are configured for the aperiodic measurement reference resources in the K1 CSI measurement and reporting parameter sets;
different public spatial characteristic parameters are configured for different CSI measurement and reporting parameter sets in the K1 CSI measurement and reporting parameter sets, where public spatial characteristic parameters configured for aperiodic measurement reference resources in a same CSI measurement and reporting parameter set are same;
different public spatial characteristic parameters are configured for different measurement reference resource sets in the K1 CSI measurement and reporting parameter sets, wherein public spatial characteristic parameters configured for aperiodic measurement reference resources in a same measurement reference resource set are same; or
spatial characteristic parameters are respectively configured for different aperiodic measurement reference resources in the K1 CSI measurement and reporting parameter sets. --

Signed and Sealed this
Twenty-first Day of February, 2023

Katherine Kelly Vidal
*Director of the United States Patent and Trademark Office*

CERTIFICATE OF CORRECTION (continued)
U.S. Pat. No. 11,469,807 B2

Column 4, Line 67, after "at least one of steps described below.", insert the following paragraphs -- Spatial characteristic parameters are respectively configured for aperiodic channel measurement reference resources and aperiodic interference measurement reference resources in the K1 CSI measurement and reporting parameter sets; or same spatial characteristic parameters are configured for the aperiodic channel measurement reference resources and the aperiodic interference measurement reference resources in the K1 CSI measurement and reporting parameter sets.
Another method for triggering measurement and reporting is provided according to the present embodiment, and the method includes steps described below.
S11, an aperiodic measurement reference resource set is configured for the receiving end.
S12, when the aperiodic measurement reference resource set includes multiple sets of aperiodic measurement reference resources, the aperiodic measurement reference resources are indicated to the receiving end by bitmap signaling; where the aperiodic measurement reference resources are used for performing rate matching and/or measurement and reporting by the receiving end. --

Column 5, Line 3, after "signaling includes at least one of manners described below.", insert the following paragraphs -- A content to be reported corresponding to the aperiodic measurement reference resources is determined, N sets of the aperiodic measurement reference resources are selected, and the N sets of the aperiodic measurement reference resources are indicated to the receiving end, where a value or a value range of N is determined according to the content to be reported;

a use corresponding to the aperiodic measurement reference resources is determined, N sets of the aperiodic measurement reference resources are selected, and the N sets of the aperiodic measurement reference resources are indicated to the receiving end, where a value or a value range of N is determined according to the use of the aperiodic measurement reference resources; or a sending parameter configuration of the aperiodic measurement reference resources is determined, N sets of the aperiodic measurement reference resources are selected, and the N sets of the aperiodic measurement reference resources are indicated to the receiving end, where N is a positive integer greater than 0, and a value or a value range of N is determined according to the sending parameter configuration of the aperiodic measurement reference resources. --

Column 5, Line 7, after "than 0.", insert the following paragraphs -- Another method for triggering measurement and reporting is provided in the present embodiment, and the method includes a step described below.
S21, reporting content indication information is configured for a channel state information (CSI) measurement and reporting parameter set.
Where, the CSI measurement and reporting parameter set includes a measurement reference resource set, the measurement reference resource set includes one or more aperiodic measurement reference resource sets, the aperiodic measurement reference resource sets include one or more sets of aperiodic measurement reference resources, and the reporting content indication information is used for indicating whether the receiving end needs to report and/or a reporting information type. --

Column 5, Line 10, after "parameter set includes one of steps described below.", insert the following paragraphs -- One piece of reporting content indication information is configured for all CSI measurement and reporting parameter sets;

one piece of reporting content indication information is configured for aperiodic measurement reference resources included in each CSI measurement and reporting parameter set;
    one piece of reporting content indication information is configured for aperiodic measurement reference resources included in each measurement reference resource set;
    one piece of reporting content indication information is configured for each of the one aperiodic measurement reference resource sets; or
    the reporting content indication information is implicitly configured according to a sending configuration of an aperiodic measurement reference resource. --

Column 5, Line 15, after "resource.", insert the following paragraphs -- Another method for triggering measurement and reporting is provided in this embodiment. The method includes steps described below.
S31, K1 channel state information (CSI) measurement and reporting parameter sets indicated by the sending end are received, where the K1 CSI measurement and reporting parameter sets include one or more sets of aperiodic measurement reference resources, and K1 is greater than or equal to 1.
S32, at least one of rate matching or CSI measurement and reporting is performed according to the aperiodic measurement reference resources. --

Column 5, Line 23, after "measurement and a joint measurement.", insert the following paragraph -- The selection measurement includes: the receiving end selects among the multiple sets of aperiodic measurement reference resources, one or more sets of aperiodic measurement reference resources are selected, and the measurement and reporting is performed, besides, selection result indication information may also be fed back. The joint measurement includes: the receiving end performs the joint measurement on multiple sets of aperiodic measurement reference resources, for example, a manner is to measure and report an average. It may also be a combination of the above manners, multiple sets of aperiodic channel measurement reference resources are selected first, and then the joint measurement is performed. --

Column 8, Line 2, after "are configured separately.", insert the following paragraphs -- Sub-manner 2: public spatial characteristic parameters are configured for aperiodic measurement reference resources included in a same measurement reference resource set. Different measurement reference resource sets are configured separately.
Sub-manner 3: spatial characteristic parameters are respectively configured for different aperiodic reference resource subsets.
Compared with conventional technical means, features of this scheme include configuring the spatial characteristic parameters of the aperiodic measurement reference resources in the CSI measurement and reporting parameter sets, while the conventional scheme is to configure the spatial characteristic parameters in a sending configuration of an aperiodic measurement reference resource. The present disclosure may significantly reduce the configured number of sets of the aperiodic measurement reference resources, simplify signaling design and increase the flexibility.
It should be noted that the spatial characteristic parameters may generally be characterized by a quasi-co-location position. For example, a QCL relationship relative to the spatial characteristic parameters exists between a measurement reference resource and a certain previously sent pilot signal.
It should be noted that spatial characteristic parameters may be configured respectively for the aperiodic channel measurement reference resources and aperiodic interference measurement reference resources, or they may share same spatial characteristic parameters. If the spatial characteristic parameters are respectively configured, spatial characteristics parameters of a same type need to be divided into one group first and then to be configured by using one of sub-manners 0 to 3.

It should be pointed out that due to different flexibility requirements for interference measurement and channel measurement, different sub-manners of sub-manners 0 to 3 may be used for performing configurations of aperiodic interference reference resources and channel measurement reference resources.

Example 2

When an aperiodic measurement reference resource set includes multiple sets of aperiodic measurement reference resources, a conventional technical means is that the multiple sets of aperiodic measurement reference resources are all used for CSI measurement.

But in fact, because measurement requirements are different in different cases, not all aperiodic measurement reference resources in the aperiodic measurement reference resource set may be actually needed measurement reference resources, only a subset of them. In order to trigger and report aperiodic measurement reference resources with pertinence, and reduce the resource waste, a better manner includes steps described below.

In step 201, for the aperiodic measurement reference resource set which includes more than one set of aperiodic measurement reference resources, the sending end uses bitmap signaling to perform a selection indication of the aperiodic measurement reference resources.

In step 202: the receiving end performs rate matching and/or measurement and reporting according to the selection indication of the aperiodic measurement reference resources sent by the sending end.

For example, if an aperiodic measurement reference resource set includes K2 aperiodic measurement reference resource sets, then bitmap signaling with K2 bits may be used for performing the indication, and a selected number of sets of aperiodic measurement reference resources is limited to be N.

For different cases, the value of N may be limited, for example:

when a reporting content is channel quality information (CQI), the value of N may be N1, and N1 may be 1 or 2, which is generally used for conventional CSI measurement and reporting;

when the reporting content is reference signal receiving power (RSRP), which is generally used for special CSI (e.g., beam information) measurement and reporting in this case, and the value of N may be N2;

when reporting is not needed (i.e., actual reported information is empty), the reference signal (RS) may be used for receiving beam training, time-frequency offset tracking, or uplink reciprocity calculation for uplink precoding, and the value of N may be N3.

That is, the value of N may be determined according to different uses. An alternative manner is to determine the value of N according to its corresponding reporting content.

In addition, it should be pointed out that determining the value of N may also need based on a type of an aperiodic measurement reference resource. Aperiodic measurement reference resources for channel measurement and interference measurement may separately determine the value of N.

Example 3

As mentioned in the above examples, some aperiodic measurement reference resources are only used for measurement and do not require feedback from the receiving end. A typical case is that the aperiodic measurement reference resources are used for time frequency offset tracking or uplink reciprocity calculation for uplink precoding. To support this case, only triggering aperiodic measurement reference resources without triggering feedback is also a special form, which needs to be supported. There are several manners described below that implement only triggering aperiodic measurement reference resources without triggering feedback.

Manner 0: one piece of public indication information is configured for all CSI measurement and reporting parameter sets to indicate whether reporting is needed or a reporting type.
Manner 1: one piece of public indication information is configured for aperiodic measurement reference resources included in a same CSI measurement and reporting parameter set to indicate whether reporting is needed or the reporting type. Different CSI measurement and reporting parameter sets are configured separately. --

Column 8, Line 15, after "of an aperiodic measurement reference resource.", insert the following paragraphs -- There are some conditions that may be used to determine whether reporting is needed or the reporting type.
For example, an aperiodic measurement reference resource has a parameter indicating whether to repeat. If it indicates repeating, it may be considered that the aperiodic measurement reference resource is mainly used for receiving beam training, and the reporting is not needed, only measurement is needed. If it indicates not repeating, a configuration parameter of the aperiodic measurement reference resource needs to be judged and a reporting content needs to be determined.
In addition, if an aperiodic measurement reference resource is used as a reference for an uplink transmission, it may be considered that a main role of the aperiodic measurement reference resource is for reciprocally acquiring uplink channel information by a terminal, and the reporting is not needed, only the measurement is needed.
In addition, if an aperiodic measurement reference resource is used as a reference for demodulation, it may be considered that a main role of the aperiodic measurement reference resource is for tracking a time frequency offset, and the reporting is not needed, only the measurement is needed. --

Column 8, Line 20, after "reference resource.", insert the following paragraphs -- For example, an aperiodic measurement reference resource has a parameter indicating whether to repeat. If it indicates repeating, it may be considered that the aperiodic measurement reference resource is mainly used for receiving beam training, and the reporting is not needed, and the aperiodic measurement reference resource may also be used for acquiring downlink CSI, and the reporting is needed. So additional signaling is required to indicate whether to report.
In addition, if an aperiodic measurement reference resource is used as a reference for an uplink transmission, it may be considered that the aperiodic measurement reference resource may play a role for reciprocally acquiring uplink channel information by the terminal, and the reporting is not needed, the aperiodic measurement reference resource may also be used for acquiring downlink CSI, and the reporting is needed. So additional signaling is needed to indicate whether to report.
Example 4
An aperiodic measurement reference resource set includes one or more sets of aperiodic measurement reference resources. When multiple sets of aperiodic measurement reference resources are included, a selection may be performed. This scheme is suitable for certain situations, but is not necessarily universal.
Therefore, the scheme proposed in this example includes followings. --

Column 8, Line 34, after "indication information may also be fed back.", insert the following paragraphs -- The joint measurement includes: the receiving end performs a joint measurement on multiple sets of aperiodic measurement reference resources, for example, a manner is to measure and report an average.

CERTIFICATE OF CORRECTION (continued)
U.S. Pat. No. 11,469,807 B2

It may also be a combination of the above manners, multiple sets of aperiodic channel measurement reference resources are selected first, then the joint measurement is performed.
Preferably, the sending end may configure a corresponding measurement manner when the aperiodic measurement reference resource set includes multiple sets of aperiodic measurement reference resources.
Preferably, it may also be agreed that aperiodic channel measurement reference resource sets and aperiodic interference measurement reference resource sets respectively use the selection measurement and the joint measurement.
Embodiment four
An embodiment of the present disclosure further provides a storage medium including a stored program. When the program is executed, the method according to any one of the embodiments described above is performed. --

Column 8, Line 37, after "below.", insert the following paragraphs -- In S1, K1 channel state information (CSI) measurement and reporting parameter sets are configured for a receiving end.
In S2, spatial characteristic parameters are configured for aperiodic measurement reference resources in the K1 CSI measurement and reporting parameter sets.
In S3, the K1 CSI measurement and reporting parameter sets are indicated to the receiving end. --

Column 8, Line 43, after "program codes.", insert the following paragraph -- An embodiment of the present disclosure further provides a processor configured to execute programs. When executed by the processor, the programs perform the steps of any above-mentioned method. --

Column 8, Line 67, after "any combination of hardware and software.", insert the following paragraph -- The above are only alternative embodiments of the present disclosure and are not intended to limit the present disclosure, and for those skilled in the art, the present disclosure may have various modifications and variations. Any modifications, equivalent substitutions, improvements and the like within the principle of the present disclosure shall fall within the scope of the present disclosure. --

In the Claims

Column 10, Line 28, Claim 5, delete "manners;" and insert -- manners: --